United States Patent

Brannan

Patent Number: 6,070,452
Date of Patent: Jun. 6, 2000

[54] PIPE LEAK LOCATOR WITH PRESSURE GAUGE

[76] Inventor: Gene T. Brannan, 8 Camelot Dr. Southeast, Lawton, Okla. 73501

[21] Appl. No.: 09/116,985

[22] Filed: Jul. 16, 1998

[51] Int. Cl.[7] .............................. G01M 3/12; F16L 55/12; G01N 3/28
[52] U.S. Cl. ........................... 73/40.5 R; 73/40; 73/49.1; 138/93; 138/90
[58] Field of Search .............................. 73/40.5 R, 49.8, 73/40, 49.1; 138/90, 93

[56] References Cited

U.S. PATENT DOCUMENTS

| | | |
|---|---|---|
| 1,543,989 | 6/1925 | Deck . |
| 2,130,030 | 9/1938 | Richardson . |
| 2,192,155 | 2/1940 | Schuldt . |
| 2,202,321 | 5/1940 | Schuldt . |
| 2,678,666 | 5/1954 | Theis et al. . |
| 4,135,385 | 1/1979 | Wattins ................ 73/40.5 R |
| 4,574,618 | 3/1986 | Anthony et al. .......... 73/40.5 R |
| 4,608,857 | 9/1986 | Mertens et al. .......... 73/40.5 R |
| 4,866,978 | 9/1989 | Biggerstaff ............. 73/40.5 R |
| 4,890,483 | 1/1990 | Vetter ................. 73/40.5 R |
| 5,375,457 | 12/1994 | Trapp .................. 73/40.7 |
| 5,467,640 | 11/1995 | Salinas ................ 73/40.5 R |
| 5,501,115 | 3/1996 | Kamiyama et al. ......... 73/865.8 |
| 5,771,937 | 6/1998 | Collins .................. 138/93 |
| 5,797,431 | 8/1998 | Adams ................... 138/89 |
| 5,894,863 | 4/1999 | Lewis et al. .............. 138/93 |
| 5,918,271 | 6/1999 | McGuigan ................ 73/49.1 |

*Primary Examiner*—Hezron Williams
*Assistant Examiner*—J. David Wiggins

[57] ABSTRACT

A pipe leak locating system is provided including a pipe with an inlet. A plug is situated within the pipe and an air generator is mounted on the inlet of the pipe with a pressure gauge coupled therebetween for detecting the release of pressure within the pipe between the inlet and the plug.

1 Claim, 3 Drawing Sheets

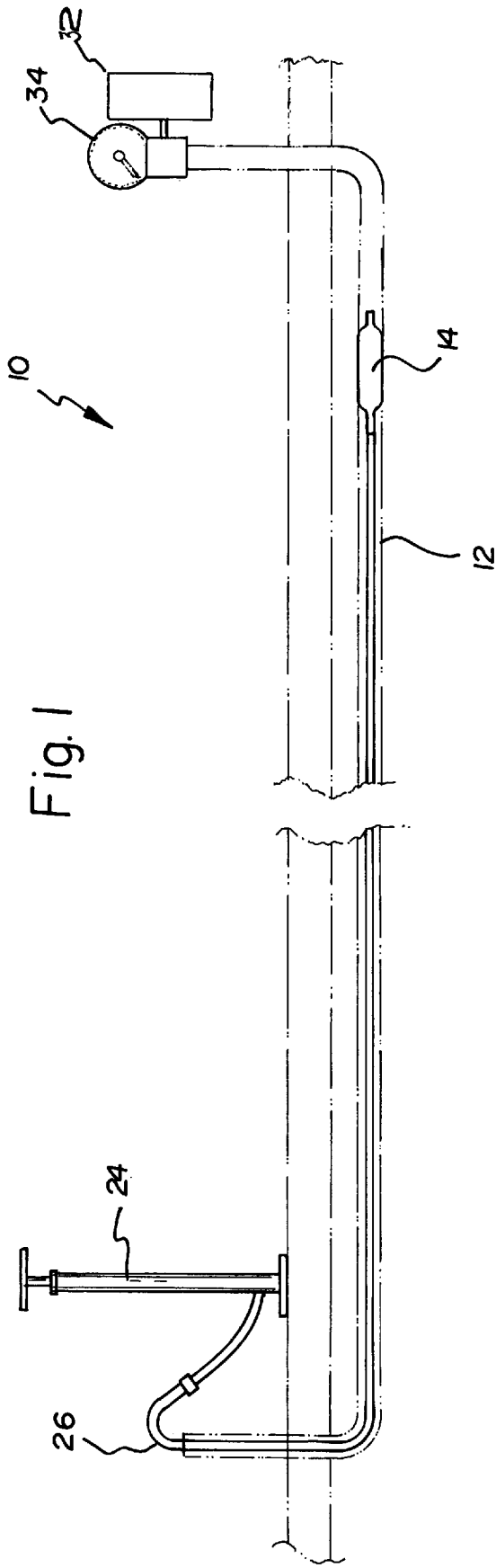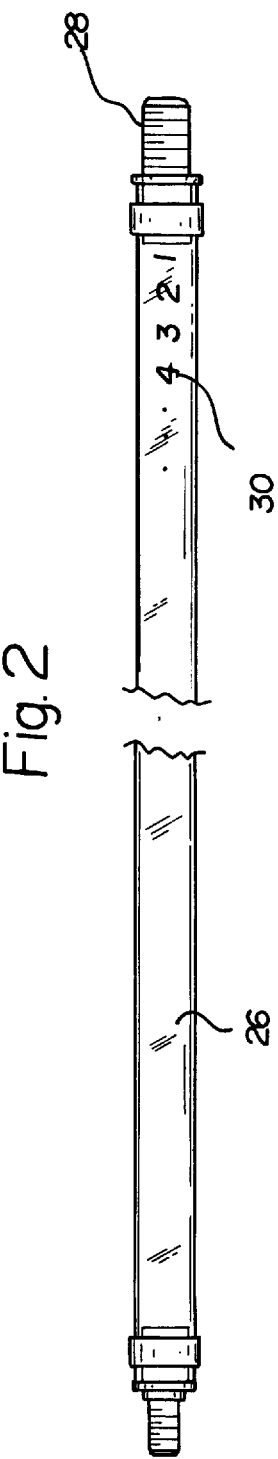

PIPE LEAK LOCATOR WITH PRESSURE GAUGE

BACKGROUND OF THE INVENTION

1. Field of the Invention

The present invention relates to pipe leak locators and more particularly pertains to a new pipe leak locator with pressure gauge for locating a leak within a pipe by observing a pressure loss within the pipe.

2. Description of the Prior Art

The use of pipe leak locators is known in the prior art. More specifically, pipe leak locators heretofore devised and utilized are known to consist basically of familiar, expected and obvious structural configurations, notwithstanding the myriad of designs encompassed by the crowded prior art which have been developed for the fulfillment of countless objectives and requirements.

Known prior art pipe leak locators include U.S. Pat. No. 4,429,720; U.S. Pat. No. 4,272,984; U.S. Pat. No. Des. 360,260; U.S. Pat. No. 4,518,015; U.S. Pat. No. 4,448,218; and U.S. Pat. No. 5,186,215.

In these respects, the pipe leak locator with pressure gauge according to the present invention substantially departs from the conventional concepts and designs of the prior art, and in so doing provides an apparatus primarily developed for the purpose of locating a leak within a pipe.

SUMMARY OF THE INVENTION

In view of the foregoing disadvantages inherent in the known types of pipe leak locators now present in the prior art, the present invention provides a new pipe leak locator with pressure gauge construction wherein the same can be utilized for locating a leak within a pipe.

The general purpose of the present invention, which will be described subsequently in greater detail, is to provide a new pipe leak locator with pressure gauge apparatus and method which has many of the advantages of the pipe leak locators mentioned heretofore and many novel features that result in a new pipe leak locator with pressure gauge which is not anticipated, rendered obvious, suggested, or even implied by any of the prior art pipe leak locators, either alone or in any combination thereof.

To attain this, the present invention is adapted for use with a pipe having a first inlet and a second inlet. The present invention includes a balloon constructed from a flexible elastomeric material. As shown in FIG. 3, the balloon is shaped to define a hemispherical outboard end, a cylindrical intermediate portion, a hemispherical inboard end and a tubular conduit when inflated. The tubular conduit has a cylindrical brass female fitting mounted thereon with a first portion with a first diameter. A plurality of annular protrusions are formed on the first portion for engaging the tubular conduit. The brass female fitting further has a second portion with a second diameter greater than the first diameter. A plurality of threaded grooves are formed in an inner surface of the second portion. As shown in FIG. 1, a hand pump is provided with a flexible outlet and a hand lever. The hand pump serves for generating pressurized air at the outlet upon the reciprocation of the hand lever. Also included is an elongated flexible tube with a pair of ends each having a brass male fitting mounted thereon. Each brass male fitting has a plurality of threaded grooves formed in an outer surface thereof. The flexible tube has measurement indicia situated along an entire length thereof. A first end of the flexible tube is removably coupled to the balloon and a second end is removably coupled to the outlet of the hand pump. In use, the balloon is situated within the first inlet of the pipe and inflated for sealing the same a predetermined distance from the first inlet. Finally, an air generator is mounted to the second inlet of the pipe with a pressure gauge coupled therebetween. After, the air generator pressurizes the pipe, the pressure gauge is adapted for detecting the release of pressure within the pipe between the second inlet and the balloon. If a decrease in pressure is observed, the indicia of the tube is used to determine a distance from the first inlet that the leak is positioned.

There has thus been outlined, rather broadly, the more important features of the invention in order that the detailed description thereof that follows may be better understood, and in order that the present contribution to the art may be better appreciated. There are additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new pipe leak locator with pressure gauge apparatus and method which has many of the advantages of the pipe leak locators mentioned heretofore and many novel features that result in a new pipe leak locator with pressure gauge which is not anticipated, rendered obvious, suggested, or even implied by any of the prior art pipe leak locators, either alone or in any combination thereof.

It is another object of the present invention to provide a new pipe leak locator with pressure gauge which may be easily and efficiently manufactured and marketed.

It is a further object of the present invention to provide a new pipe leak locator with pressure gauge which is of a durable and reliable construction.

An even further object of the present invention is to provide a new pipe leak locator with pressure gauge which is susceptible of a low cost of manufacture with regard to both materials and labor, and which accordingly is then susceptible of low prices of sale to the consuming public, thereby making such pipe leak locator with pressure gauge economically available to the buying public.

Still yet another object of the present invention is to provide a new pipe leak locator with pressure gauge which provides in the apparatuses and methods of the prior art some of the advantages thereof, while simultaneously overcoming some of the disadvantages normally associated therewith.

Still another object of the present invention is to provide a new pipe leak locator with pressure gauge for locating a leak within a pipe.

Even still another object of the present invention is to provide a new pipe leak locator with pressure gauge that includes a pipe with an inlet. A plug is situated within the pipe and an air generator is mounted on the inlet of the pipe with a pressure gauge coupled therebetween for detecting the release of pressure within the pipe between the inlet and the plug.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be made to the accompanying drawings and descriptive matter in which there are illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein:

FIG. 1 is a side view of a new pipe leak locator with pressure gauge according to the present invention.

FIG. 2 is a side view of the tube of the present invention.

DESCRIPTION OF THE PREFERRED EMBODIMENT

Figure 3:
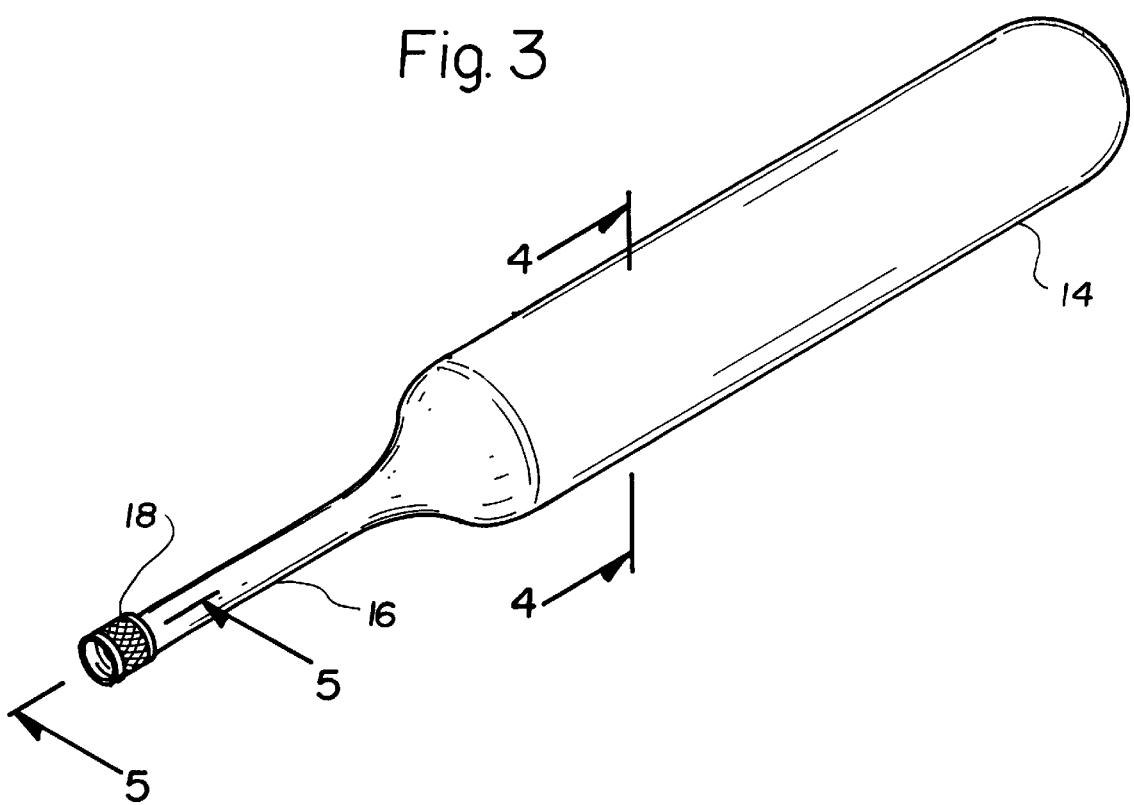
FIG. 3 is a perspective view of the inflated balloon of the present invention.
Figure 4:
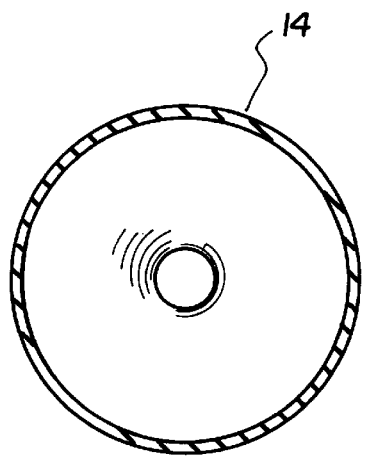
FIG. 4 is a cross-sectional view of the inflated balloon of the present invention taken along line 4—4 shown in FIG. 3.
Figure 5:
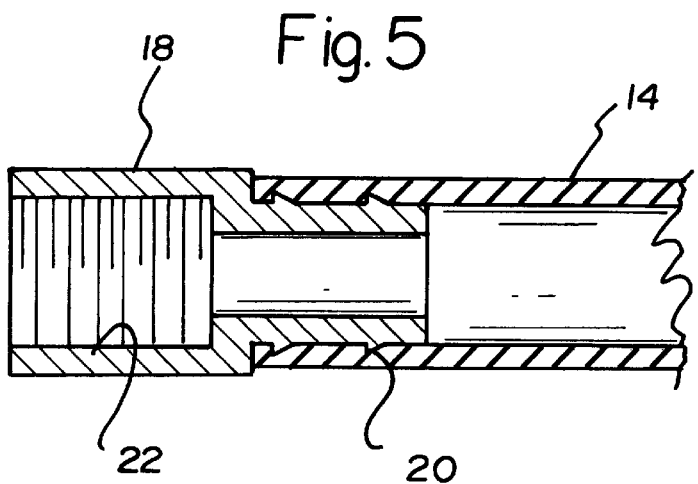
FIG. 5 is a cross-sectional view of the brass female fitting of the present invention taken along line 5—5 shown in FIG. 3.
Figure 6:
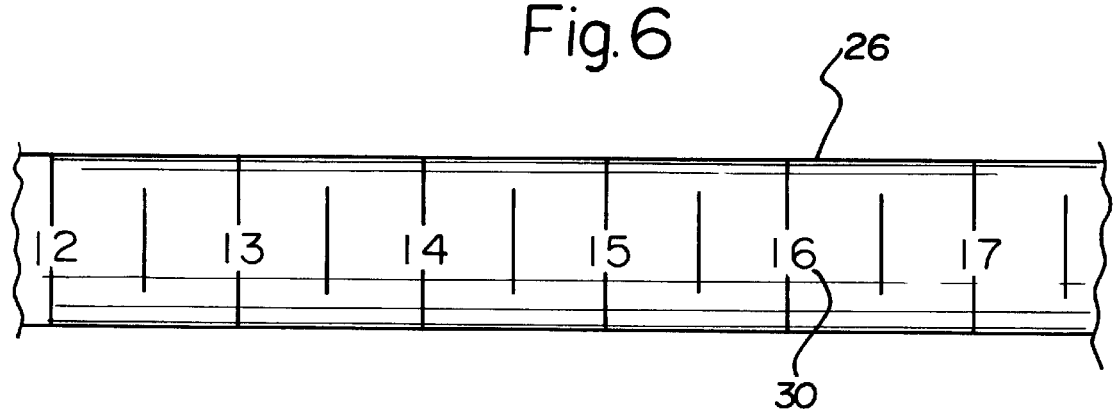
FIG. 6 is a side view of the tube of the present invention showing the measurement indicia thereof.

With reference now to the drawings, and in particular to FIGS. 1 through 6 thereof, a new pipe leak locator with pressure gauge embodying the principles and concepts of the present invention and generally designated by the reference numeral 10 will be described.

The present invention, designated as numeral 10, is adapted for use with a pipe 12 having a first inlet and a second inlet. The pipe may be situated beneath a wall or earth or in any other environment. The present invention includes a balloon 14 constructed from a flexible elastomeric material. As shown in FIG. 3, the balloon is shaped to define a hemispherical outboard end, a cylindrical intermediate portion, a hemispherical inboard end and a tubular conduit 16 when inflated. When deflated, the entire balloon has a constant diameter equal to that of the aforementioned tubular conduit.

The tubular conduit has a cylindrical brass female fitting 18 mounted thereon with a first portion having a first diameter. A plurality of annular protrusions 20 are formed on the first portion for engaging the tubular conduit. The brass female fitting further has a second portion with a second diameter greater than the first diameter. A plurality of threaded grooves 22 are formed in an inner surface of the second portion.

As shown in FIG. 1, a hand pump 24 is provided with a flexible outlet and a hand lever. The hand pump serves for generating pressurized air at the outlet upon the reciprocation of the hand lever.

Also included is an elongated flexible tube 26 with a pair of ends each having a brass male fitting 28 mounted thereon. Each brass male fitting has a plurality of threaded grooves formed in an outer surface thereof. The flexible tube also has measurement indicia 30 situated along an entire length thereof. A first end of the flexible tube is removably coupled to the balloon and a second end is removably coupled to the outlet of the hand pump. The tube is preferably constructed from a semi-rigid polyethylene tubing with a length of about 75 feet.

As shown in FIG. 1, the balloon is situated within the first inlet of the pipe and inflated for sealing the same a predetermined distance from the first inlet. When not being used, the tube may be stored on a spool or the like. Finally, a mechanized air generator 32 is mounted to the second inlet of the pipe with a pressure gauge 34 coupled therebetween. It should be noted that the hand pump and mechanized air generator may be interchanged or excluded in favor of any other type of air generator.

In use, the air generator is used to pressurize the pipe. Thereafter, the pressure gauge is employed for detecting the release of pressure within the pipe between the second inlet and the balloon. If a decrease in pressure is observed, the indicia of the tube is used to determine a minimal distance from the first inlet that the leak is positioned. The above process may be repeated while increasingly inserting the balloon within the pipe in order to more exactly locate the leak. In an alternate embodiment, the balloon may be equipped with a sonar transmitter for locating the same within the pipe.

As to a further discussion of the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

I claim:

1. A pipe leak locating system for use with a pipe with a first inlet, an outlet and a second inlet;

a balloon capable of being inflated to block the pipe at the location of a leak in the pipe constructed from a flexible elastomeric material and shaped to define a hemispherical outboard end, a cylindrical intermediate portion without any internal support rods, tubes, bars or spring elements, a hemispherical inboard end and a tubular conduit, the tubular conduit having a fitting mounted thereon with a first portion with a first diameter and a plurality of annular protrusions formed thereon for engaging the tubular conduit and a second connector portion with a second diameter greater than the first diameter with a plurality of threaded grooves formed in an inner surface thereof;

a hand pump with a flexible outlet and a hand lever for generating pressurized air at the outlet upon the reciprocation of the hand pump;

an elongated flexible tube with a pair of ends each having a mating connector fitting mounted thereon with a plurality of threaded grooves formed in an outer surface thereof, the flexible tube having a flexible perimeter wall with an outer surface, the flexible tube designed and manipulated to allow a lengthwise insertion thru a pipe inlet while having a length of 75 feet for allowing capability of reaching into the pipes where a great distance exists between the first inlet and outlet;

the flexible tube having measurement indicia marked directly on the outer surface of the perimeter wall thereof, the measurement indicia extending along an entire length of the flexible tube starting from a first of the ends of the flexible tube and ending at a second of the ends of the flexible tube so as to provide a ruled scale fixed in position along the full length of said flexible tube against which measurements of relative movement between the flexible tube and pipe during said insertion can be viewed directly, easily and accurately, wherein a first end of the flexible tube is removably coupled to the balloon and a second end is removably coupled to the outlet of the hand pump, wherein the balloon in a deflated condition may be situated within the first inlet of the pipe, then moved along a fractional length of the pipe, and inflated by action if said hand lever for sealing the same balloon across an inner perimeter wall of said pipe at a predetermined distance from the first inlet; and an air generator mountable to the second inlet of the pipe with a pressure gauge coupled therebetween for detecting the release of pressure within the pipe between the second inlet and the balloon inflated, wherein the indicia of the movable flexible tube is used to determine a distance into the pipe from the first inlet that the leak is positioned.

* * * * *